US012770907B2

(12) United States Patent
Si

(10) Patent No.: US 12,770,907 B2

(45) Date of Patent: Oct. 20, 2026

(54) LITHIUM BATTERY WINDING NEEDLE

(71) Applicant: SHENZHEN TIAN HAO EQUIPMENT PTY LTD, Shenzhen (CN)

(72) Inventor: Shengke Si, Shenzhen (CN)

(73) Assignee: SHENZHEN TIAN HAO EQUIPMENT PTY LTD, Shenzhen (CN)

( * ) Notice: Subject to any disclaimer, the term of this patent is extended or adjusted under 35 U.S.C. 154(b) by 468 days.

(21) Appl. No.: 18/389,816

(22) Filed: Dec. 20, 2023

(65) Prior Publication Data

US 2024/0178432 A1 May 30, 2024

Related U.S. Application Data

(63) Continuation of application No. PCT/CN2021/128024, filed on Nov. 2, 2021.

(30) Foreign Application Priority Data

Jul. 19, 2021 (CN) ........................ 202110814283.3

(51) Int. Cl.
*H01M 10/04* (2006.01)

(52) U.S. Cl.
CPC ............................... *H01M 10/0409* (2013.01)

(58) Field of Classification Search
CPC ...... H01M 6/00; H01M 6/14; H01M 10/0409; H01M 10/0587; H01M 10/052; Y02E 60/10; Y02P 70/50
See application file for complete search history.

(56) References Cited

FOREIGN PATENT DOCUMENTS

| | | | | |
|---|---|---|---|---|
| CN | 206301902 A | | 7/2017 | |
| CN | 108400370 A | | 8/2018 | |
| CN | 109599594 A | | 4/2019 | |
| CN | 110247095 | * | 9/2019 | ............ H01M 10/04 |
| CN | 110752381 A | | 2/2020 | |
| CN | 213042933 A | | 4/2021 | |
| CN | 113540482 | | 10/2021 | |
| KR | 101686771 A | | 12/2016 | |

OTHER PUBLICATIONS

English Translation of CN110247095.*
International search report of PCT/CN2021/128024.

* cited by examiner

*Primary Examiner* — Kiran Quraishi Akhtar
(74) *Attorney, Agent, or Firm* — Hemisphere Law, PLLC

(57) ABSTRACT

The present disclosure discloses a lithium battery winding needle. A first arc-shaped column, a second arc-shaped column, a third arc-shaped column, and a fourth arc-shaped column are enclosed in sequence to form a cylindrical hollow chamber structure. The first arc-shaped column and the second arc-shaped column are hinged to each other by means of a first hinge point. The second arc-shaped column and the third arc-shaped column are hinged to each other by means of a second hinge point. The third arc-shaped column and the fourth arc-shaped column are hinged to each other by means of a third hinge point. The fourth arc-shaped column and the first arc-shaped column are hinged to each other by means of a fourth hinge point. The processing efficiency and quality are significantly improved; and processing costs are greatly reduced.

5 Claims, 8 Drawing Sheets

LITHIUM BATTERY WINDING NEEDLE

CROSS-REFERENCE TO RELATED APPLICATION

This application claims priority to Chinese Patent Application No. CN202110707227.X, entitled "LITHIUM BATTERY WINDING NEEDLE" and filed on Jun. 24, 2021 and Chinese Patent Application No. CN202110814283.3, entitled "LITHIUM BATTERY WINDING NEEDLE" and filed on Jul. 19, 2021. The entire contents of the above-referenced applications are incorporated herein by reference.

TECHNICAL FIELD

The present disclosure relates to the technical field of manufacturing of lithium batteries, and in particular, to a lithium battery winding needle, specifically a winding needle of a square lithium battery winding machine.

BACKGROUND

In the prior art, a winding needle in square lithium battery winding machine equipment is fusiform, so that it is difficult to control an expansion force when a pole piece and a separator are wound on a winding needle, which affects the efficiency and the quality.

SUMMARY

To this end, the present disclosure provides a lithium battery winding needle, so as to solve the above problems in the prior art.

In order to achieve the above objective, the present disclosure provides the following technical solutions:

According to a first aspect of the present disclosure, a lithium battery winding needle includes a first arc-shaped column, a second arc-shaped column, a third arc-shaped column, a fourth arc-shaped column, a first hinge point, a second hinge point, a third hinge point, a fourth hinge point, a first separator clip, and a second separator clip, wherein the first arc-shaped column, the second arc-shaped column, the third arc-shaped column, and the fourth arc-shaped column are enclosed in sequence to form a cylindrical hollow chamber structure; the first arc-shaped column and the second arc-shaped column are hinged to each other through the first hinge point; the second arc-shaped column and the third arc-shaped column are hinged to each other through the second hinge point; the third arc-shaped column and the fourth arc-shaped column are hinged to each other through the third hinge point; the fourth arc-shaped column and the first arc-shaped column are hinged to each other through the fourth hinge point; and the first separator clip and the second separator clip are arranged in the cylindrical hollow chamber structure.

Further, during winding operation, a separator is inserted between the first separator clip and the second separator clip.

Further, the first separator clip is fixed inside the fourth arc-shaped column; and the second separator clip is fixed inside the first arc-shaped column.

Further, radiuses of cambered surfaces of the first arc-shaped column, the second arc-shaped column, the third arc-shaped column, and the fourth arc-shaped column are the same, and an outer cambered surface is a part of a peripheral side surface of a cylinder. In addition, the first arc-shaped column, the second arc-shaped column, the third arc-shaped column, and the fourth arc-shaped column can also be any other structural forms.

Further, a battery core is wound on a peripheral side of the whole enclosed by the first arc-shaped column, the second arc-shaped column, the third arc-shaped column, and the fourth arc-shaped column.

Further, the second hinge point is a first open type hinge.

Further, the fourth hinge point is a second open type hinge.

Further, the lithium battery winding needle includes an elastic body; and the clastic body sleeves the peripheral side of the whole enclosed by the first arc-shaped column, the second arc-shaped column, the third arc-shaped column, and the fourth arc-shaped column.

Further, the elastic body is an annular tension spring or a rubber ring and another elastic annular structure.

Further, a chamber cross section in the cylindrical hollow chamber structure enclosed by the first arc-shaped column, the second arc-shaped column, the third arc-shaped column, and the fourth arc-shaped column is an equilateral quadrangle.

Further, the lithium battery winding needle further includes a winding needle shank and an air cylinder; the first hinge point, the second hinge point, the third hinge point, and the fourth hinge point are all provided with support rods; the winding needle shank is provided with opposite guide slots; the two diagonally arranged support rods are slidably inserted into the guide slots; a fixed end of the air cylinder is mounted on one of the support rods; and an end portion of a telescopic rod of the air cylinder is mounted on the other support rod.

The present disclosure has the following advantages: The lithium battery winding needle of the present disclosure can solve the problem in the prior art that changes in an expansion force are difficult to control when a pole piece and a separator are wound on a winding needle. The processing efficiency and quality are significantly improved; and processing costs are greatly reduced.

BRIEF DESCRIPTION OF THE DRAWINGS

In order to describe the technical solutions of the implementations of the present disclosure or in the prior art more clearly, the following will briefly describe the accompanying drawings required for describing the implementations or the prior art. Apparently, the accompanying drawings in the following description are only exemplary, and a person of ordinary skill in the art can still derive other implementation drawings according to these accompanying drawings without creative work.

The structure, proportion, size, and the like depicted in this specification are only intended to cooperate with the content disclosed in this specification for those familiar with the technology to understand and read, and are not intended to limit the conditions for the implementation of the present disclosure. Therefore, they do not have any technical substantive significance. Without affecting the effects that can be achieved by the present disclosure and purposes that can be achieved, any modification of structures, change of proportion relationships, or adjustment of sizes shall all fall within the scope covered by the technical content disclosed in the present disclosure.

Figure 1:
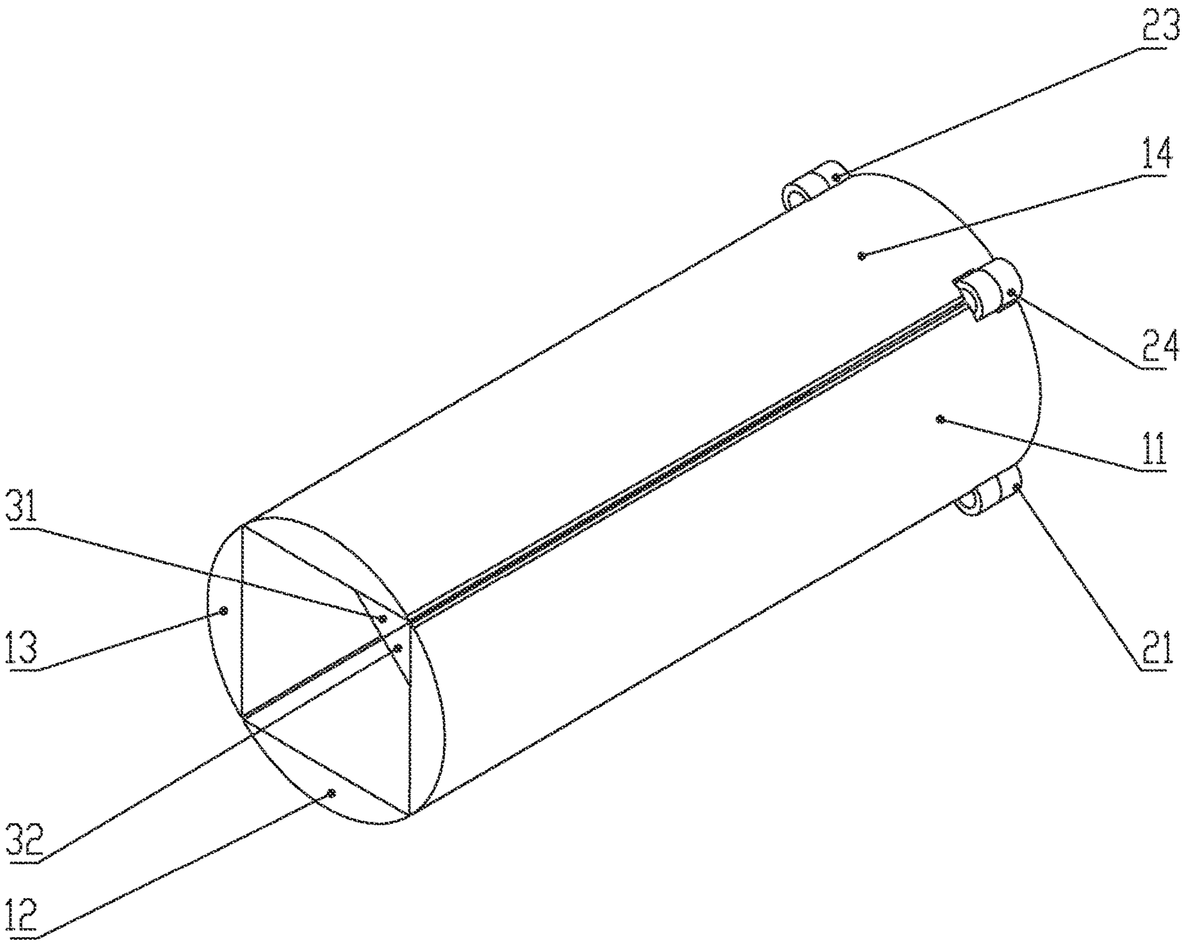
FIG. 1 is a structural diagram of a winding needle of a lithium battery winding needle according to some embodiments of the present disclosure.
Figure 2:
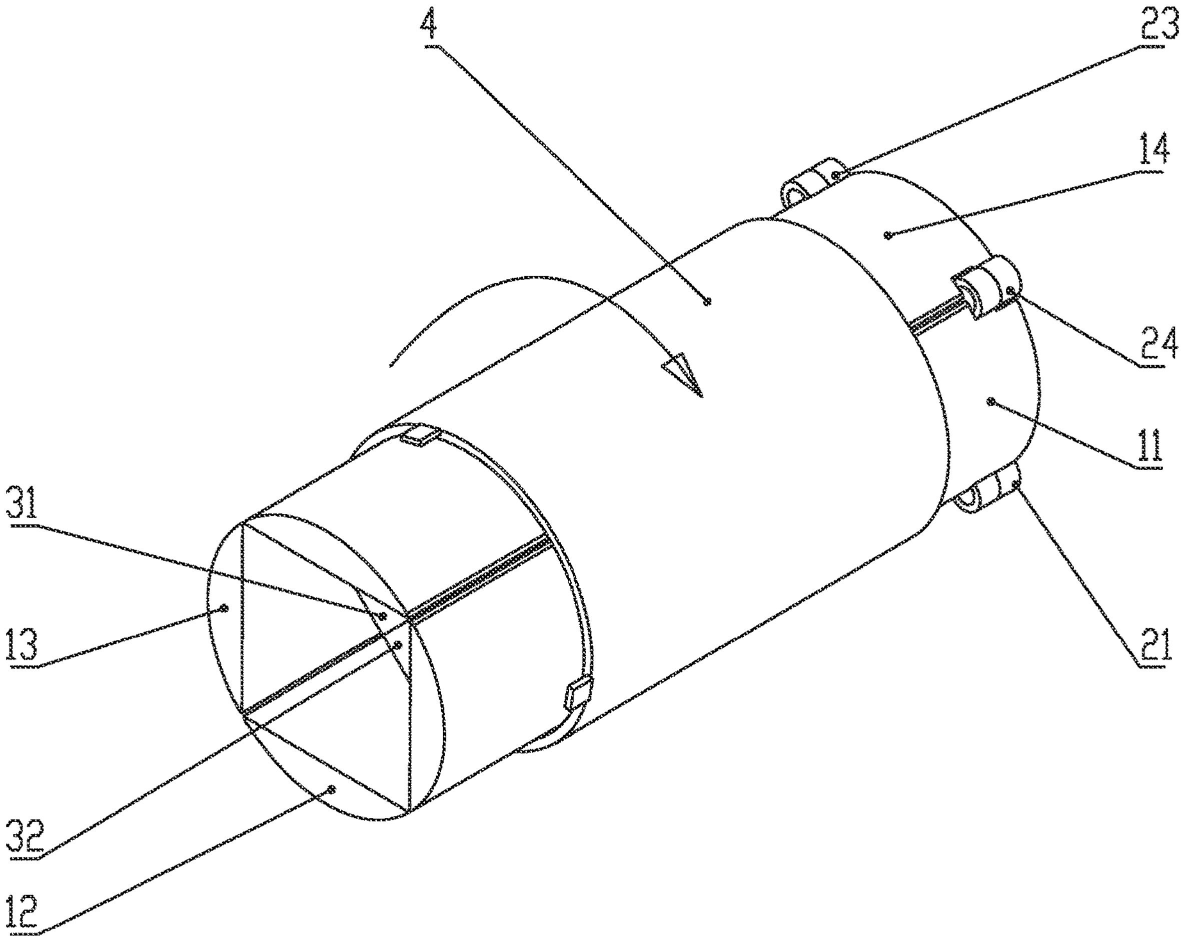
FIG. 2 is a diagram of a position and shape where a battery core is wound on a winding needle of a lithium battery winding needle according to some embodiments of the present disclosure.
Figure 3:
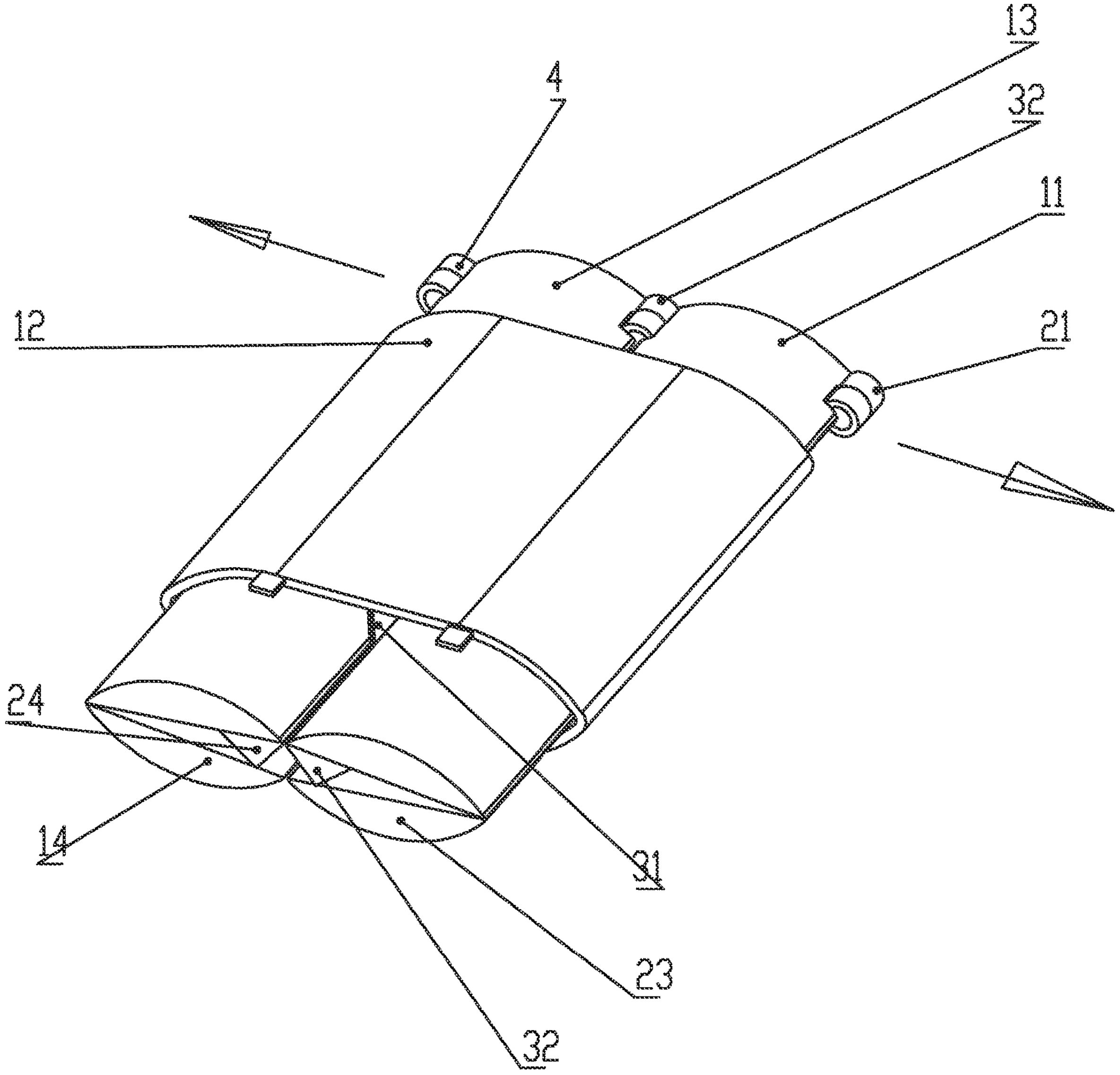
FIG. 3 is shows that two corresponding hinge points are stressed, a winding needle deforms, and a battery core is fusiform of a lithium battery winding needle according to some embodiments of the present disclosure.
Figure 4:
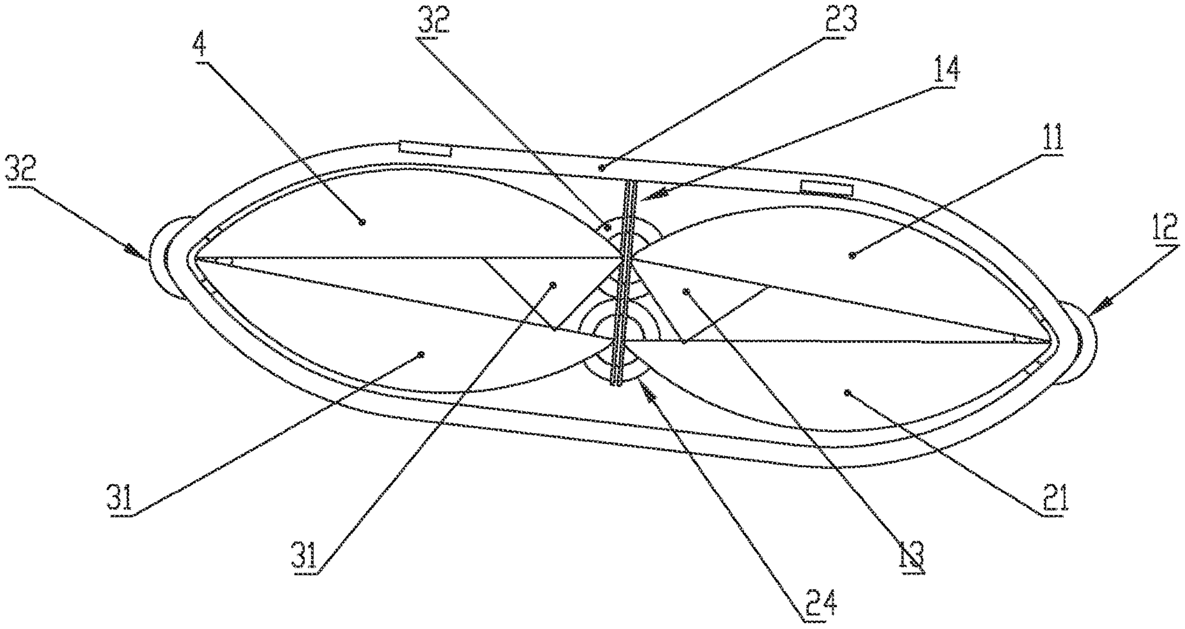
FIG. 4 is a front view of a fusiform battery core after a winding needle deforms of a lithium battery winding needle according to some embodiments of the present disclosure.

In the drawings: 11: first arc-shaped column; 12: second arc-shaped column; 13: third arc-shaped column; 14: fourth arc-shaped column; 21: first hinge point; 22: second hinge point; 23: third hinge point; 24: fourth hinge point; 22*a*: first open type hinge; 24*a*: second open type hinge; 31: first separator clip; 32: second separator clip; 4: battery core; 5: separator; 6: clastic body; 7: support rod; 8: air cylinder; 9: winding needle shank; and 10: guide slot.

DETAILED DESCRIPTION OF THE EMBODIMENTS

The following specific embodiments are used to illustrate the implementations of the present disclosure. Those skilled in the art can easily understand other advantages and effects of the present disclosure from the content disclosed in this specification. Obviously, the described embodiments are part of the embodiments of the present disclosure, not all of them. All other embodiments obtained by a person of ordinary skill in the art based on the embodiments of present disclosure without making creative efforts shall fall within the protection scope of present disclosure.

As shown in FIG. 1 to FIG. 5, a lithium battery winding needle in an embodiment of a first aspect of the present disclosure includes a first arc-shaped column 11, a second arc-shaped column 12, a third arc-shaped column 13, a fourth arc-shaped column 14, a first hinge point 21, a second hinge point 22, a third hinge point 23, a fourth hinge point 24, a first separator clip 31, and a second separator clip 32. The first arc-shaped column 11, the second arc-shaped column 12, the third arc-shaped column 13, and the fourth arc-shaped column 14 are enclosed in sequence to form a cylindrical hollow chamber structure; the first arc-shaped column 11 and the second arc-shaped column 12 are hinged to each other through the first hinge point 21; the second arc-shaped column 12 and the third arc-shaped column 13 are hinged to each other through the second hinge point 22; the third arc-shaped column 13 and the fourth arc-shaped column 14 are hinged to each other through the third hinge point 23; the fourth arc-shaped column 14 and the first arc-shaped column 11 are hinged to each other through the fourth hinge point 24; and the first separator clip 31 and the second separator clip 32 are arranged in the cylindrical hollow chamber structure.

In the above embodiments, it should be noted that radiuses of cambered surfaces of the first arc-shaped column 11, the second arc-shaped column 12, the third arc-shaped column 13, and the fourth arc-shaped column 14 are the same, and the cambered surfaces are parts that constitute a surface of a cylinder. The first hinge point 21, the second hinge point 22, the third hinge point 23, and the fourth hinge point 24 are closed type hinges, and 22*a* and 24*a* are open type hinges.

Technical effects achieved by the above embodiment are as follows: The lithium battery winding needle of the present disclosure can solve the problem in the prior art that changes in an expansion force are difficult to control when a pole piece and a separator are wound on a winding needle. The processing efficiency and quality are significantly improved; and processing costs are greatly reduced.

Optionally, as shown in FIG. 1 to FIG. 5, in some embodiments, during winding operation, when the winding needle hinge points 22 and 24 (22*a*, 24*a*) approach a circle center, the first separator clip 31 and the second separator clip 32 are opened, and a separator 5 is inserted between them. When the winding needle is circular, the first separator clip 31 and the second separator clip 32 clamp the separator 5, and a pole piece is inserted. The winding needle begins to rotate.

Optionally, as shown in FIG. 1 to FIG. 5, in some embodiments, the first separator clip 31 is fixed inside the fourth arc-shaped cylinder 14; and the second separator clip 32 is fixed inside the first arc-shaped cylinder 11.

Optionally, as shown in FIG. 1 to FIG. 5, in some embodiments, the first arc-shaped column 11, the second arc-shaped column 12, the third arc-shaped column 13, and the fourth arc-shaped column 14 have the same arc surface radius and the outer arc surface is a part of the outer peripheral side of a cylinder. In addition, the first arc-shaped column 11, the second arc-shaped column 12, the third arc-shaped column 13, and the fourth arc-shaped column 14 can also be any other structural form.

Optionally, as shown in FIG. 1 to FIG. 5, in some embodiments, a battery core 4 is wound on a peripheral side of the whole enclosed by the first arc-shaped column 11, the second arc-shaped column 12, the third arc-shaped column 13, and the fourth arc-shaped column 14.

In the above optional embodiments, it should be noted that battery core 4 is formed by stacking and winding a battery positive plate, a separator, a negative plate, and a separator. Optionally, as shown in FIG. 1 to FIG. 5, in some embodiments, the second hinge point 22 is a first open type hinge 22*a*.

Optionally, as shown in FIG. 1 to FIG. 5, in some embodiments, the fourth hinge point 24 is a second open type hinge 24*a*.

Optionally, as shown in FIG. 1 to FIG. 5, in some embodiments, the lithium battery winding needle further includes an elastic body 6; and the elastic body 6 sleeves a peripheral side of the whole enclosed by the first arc-shaped column 11, the second arc-shaped column 12, the third arc-shaped column 13, and the fourth arc-shaped column 14.

Optionally, as shown in FIG. 1 to FIG. 5, in some embodiments, the elastic body 6 is an annular tension spring or a rubber ring and another clastic annular structure.

Optionally, as shown in FIG. 1 to FIG. 5, in some embodiments, the first arc-shaped column 11, the second arc-shaped column 12, the third arc-shaped column 13, and the fourth arc-shaped column 14 are enclosed in sequence to form the cylindrical hollow chamber structure.

Optionally, the lithium battery winding needle further includes a winding needle shank 9 and an air cylinder 8; the first hinge point 21, the second hinge point 22, the third hinge point 23, and the fourth hinge point 24 are all provided with support rods 7; the winding needle shank 9 is provided with opposite guide slots 10; the two diagonally arranged support rods 7 are slidably inserted into the guide slots 10; a fixed end of the air cylinder 8 is mounted on one of the support rods 7; and an end portion of a telescopic rod of the air cylinder 8 is mounted on the other support rod 7.

Technical effects achieved by the above embodiment are as follows: By use of the air cylinder 8 for driving, actions of the entire device for winding the battery core and taking out the battery core are achieved.

The lithium battery winding needle of the present disclosure can solve the above-mentioned problems in the background section. When the pole piece and the separator 5 are wound on the winding needle, the winding needle is circular, and an expansion force does not fluctuate. After the winding is completed, the winding needle changes under the action of an external force, and the battery core is changed into a fusiform shape. The lithium battery winding needle is formed by hinging the four arc-shaped columns with equal radiuses. When circle centers of four cambered surfaces of the first arc-shaped column 11, the second arc-shaped column 12, the third arc-shaped column 13, and the fourth arc-shaped column 14 overlap, the winding needle is circular, and the wound battery core is also circular. Under the action of the external force, when the two hinge points 23, 21 corresponding to the winding needle are away from the circle center (or one hinge point is away from the circle center and the other hinge point remains stationary), the other two hinge points 22, 24 (22*a*, 24*a*) are close to the circle center. In this way, the battery core is extended in a diameter direction, forming the fusiform shape. A manipulator takes off the battery core for shaping, so as to obtain a desired square battery.

Figure 5:
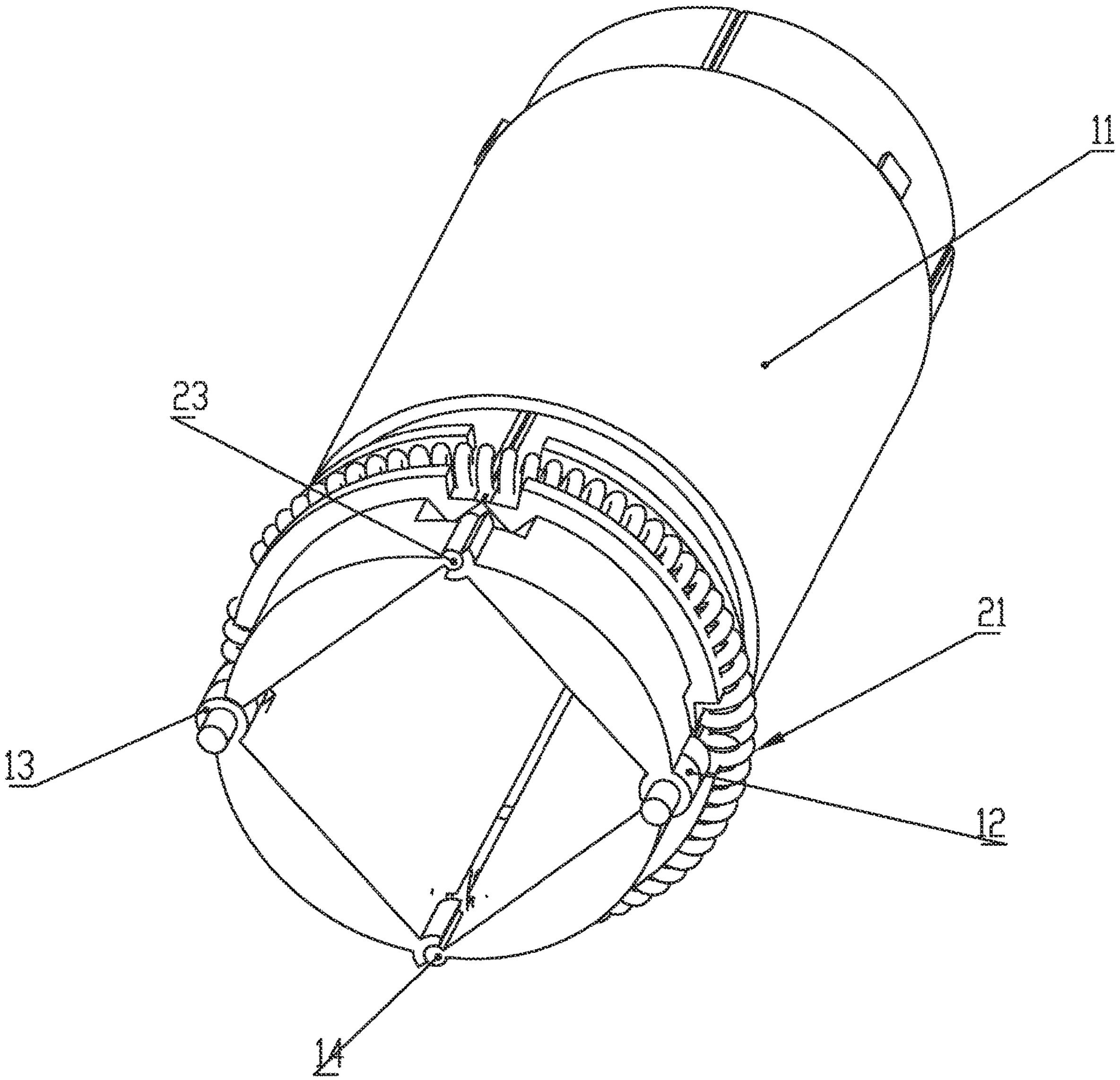
FIG. 5 is an open type hinge winding needle applied to a small-sized battery core of a lithium battery winding needle according to some embodiments of the present disclosure.
Figure 6:
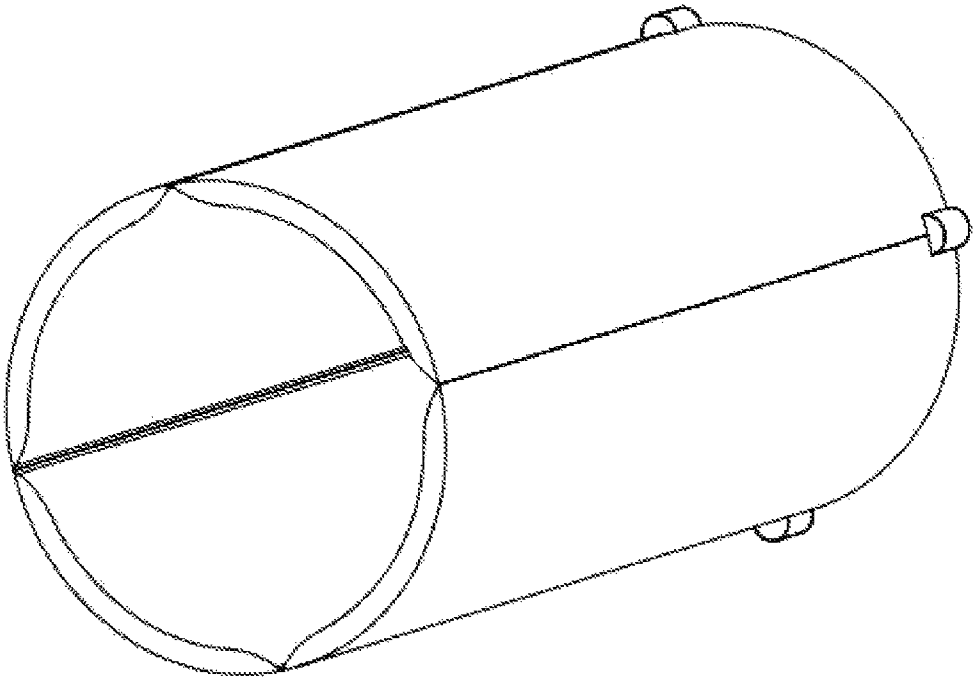
FIG. 6 shows different inner chamber structures of a lithium battery winding needle according to some embodiments of the present disclosure.
Figure 7:
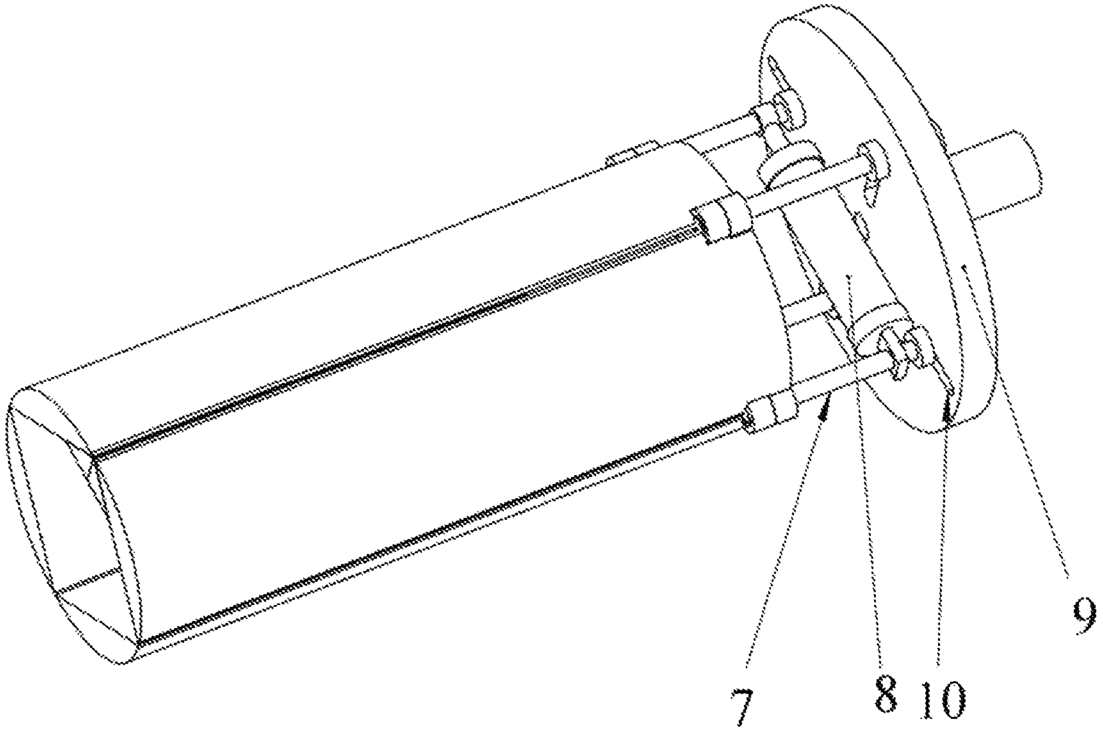
FIG. 7 shows a form of a lithium battery winding needle according to some embodiments of the present disclosure when a battery core is wound (when an air cylinder retracts, the winding needle is circular).
Figure 8:
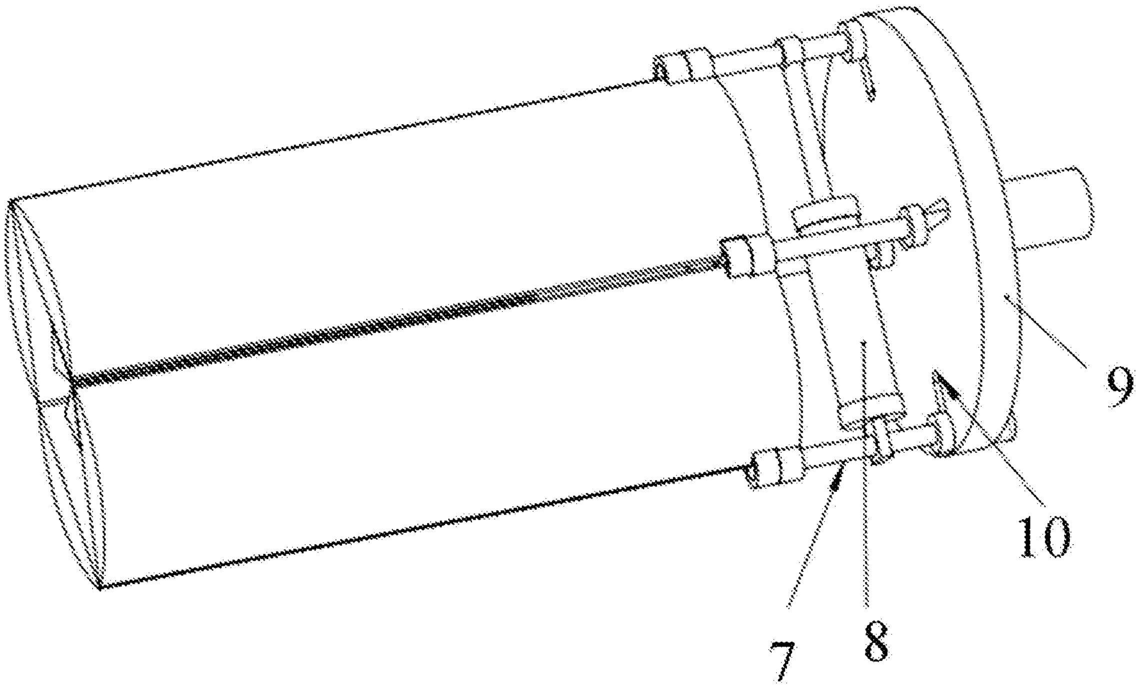
FIG. 8 shows a form of a winding needle of a lithium battery winding needle according to some embodiments of the present disclosure when the winding needle deforms, and a battery is taken out (when an air cylinder rod extends, the winding needle is non-circular).

Implementation of the above embodiment is as follows: The winding needle in FIG. 1 is connected to a rotating shaft of a winding machine through a mechanism. When the winding needle is cylindrical, the winding needle is concentric with the rotating shaft. The mechanism enables the first hinge point 21 and the third hinge point 23 to get away from the circle center (or one of the hinge points gets away, and the other hinge point is stationary), and the second hinge point 22 and the fourth hinge point 24 get close to the circle center. At the same time, the first separator clip 31 and the second separator clip 32 are opened. After the separator 5 is inserted, the mechanism enables the first hinge point 21 and the third hinge point 23 to get close to the circle center. When the cambered surfaces of the first arc-shaped column 11, the second arc-shaped column 12, the third arc-shaped column 13, and the fourth arc-shaped column 14 are concentric, the first separator clip 31 and the second separator clip 32 have already clamped the separator 5. Winding is started after the positive plate and the negative plate are inserted into separator 5. At this time, the expansion force does not change, a winding speed can be high, and the battery core has good quality. When the winding is about to be completed, the separator is cut off. The separator 5 is fixed with a tape, so that a circular battery core is well wound. When the battery core is taken out, the mechanism enables the first hinge point 21 and the third hinge point 23 to get away from the circle center (or one hinge point gets away, and one hinge point is stationary), and the second hinge point 22 and the fourth hinge point 24 get close to the circle center. At the same time, the first separator clip 31 and the second separator clip 32 are opened. The battery core is now transformed into the fusiform shape by the winding needle. After the deformation of the winding needle, an internal perimeter of the battery core is greater than a length of the winding needle that is in contact with the battery core, and the manipulator can smoothly remove the battery core. After shaping, a square battery is obtained. FIG. 5 shows a winding needle for winding a small square battery. The first open type hinge 22*a* and the second open type hinge 24*a* are open type hinges, which are designed to be closer to the circle center, making it easier for the battery core to be removed from the winding needle. The annular clastic body 6 provides a force that only opens the open type hinges, but not separates them.

Although the present disclosure has been described in detail with general explanations and specific embodiments in the previous text, some modifications or improvements can be made on the basis of the present disclosure, which is obvious to those skilled in the art. Therefore, these modifications or improvements made on the basis of not deviating from the spirit of the present disclosure belong to the scope of protection claimed by the present disclosure.

The terms used in this specification, such as "up", "down", "left", "right", and "middle", are only for the sake of clarity and are not intended to limit the scope of implementation of the present disclosure. Any changes or adjustments in their relative relationships, without substantial technical changes, shall also be considered as the scope of implementation of the present disclosure.

What is claimed is:

1. A lithium battery winding needle, comprising a first arc-shaped column (11), a second arc-shaped column (12), a third arc-shaped column (13), a fourth arc-shaped column (14), a first hinge point (21), a second hinge point (22), a third hinge point (23), a fourth hinge point (24), a first separator clip (31), and a second separator clip (32), wherein the first arc-shaped column (11), the second arc-shaped column (12), the third arc-shaped column (13), and the fourth arc-shaped column (14) are enclosed in sequence to form a cylindrical hollow chamber structure; the first arc-shaped column. (11) and the second arc-shaped column (12) are hinged to each other through the first hinge point (21); the second arc-shaped column (12) and the third arc-shaped column (13) are hinged to each other through the second hinge point (22); the third arc-shaped column (13) and the fourth arc-shaped column (14) are hinged to each other through the third hinge point (23); the fourth arc-shaped column (14) and the first arc-shaped column (11) are hinged to each other through the fourth hinge point (24); and the first separator clip (31) and the second separator clip (32) are arranged in the cylindrical hollow chamber structure;

wherein the second hinge point (22) is a first open type hinge (22*a*); and wherein the fourth hinge point (24) is a second open type hinge (24*a*).

2. The lithium battery winding needle according to claim 1, wherein the first separator clip (31) is fixed inside the fourth arc-shaped column (14); and the second separator clip (32) is fixed inside the first arc-shaped column (11).

3. The lithium battery winding needle according to claim 1, wherein radiuses of cambered surfaces of the first arc-shaped column (11), the second arc-shaped column (12), the third arc-shaped column (13), and the fourth arc-shaped column (14) are the same, and an outer cambered surface is a part of a peripheral side surface of the cylinder.

4. The lithium battery winding needle according to claim 1, further comprising an elastic body (6), wherein the elastic body (6) sleeves a peripheral side of the whole enclosed by the first arc-shaped column (11), the second arc-shaped column (12), the third arc-shaped column (13), and the fourth arc-shaped column.

5. The lithium battery winding needle according to claim 4, wherein the elastic body (6) is an annular tension spring or a rubber ring.

* * * * *